H. DECH.
INNER TUBE AND METHOD OF MAKING THE SAME.
APPLICATION FILED AUG. 14, 1918.
1,340,702.  Patented May 18, 1920.
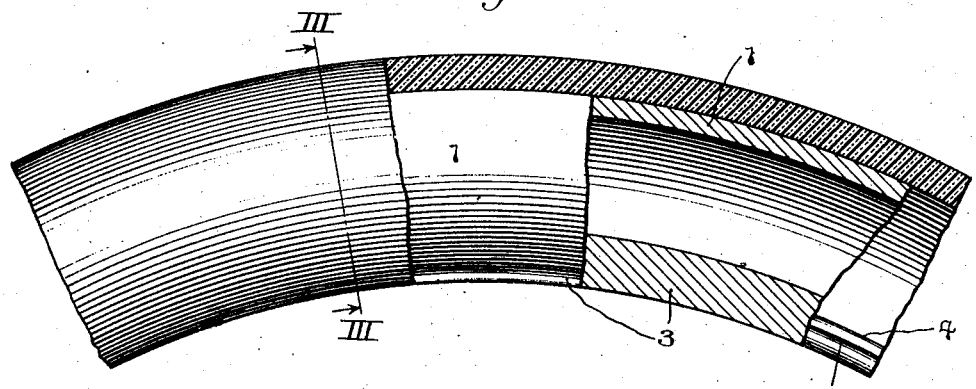
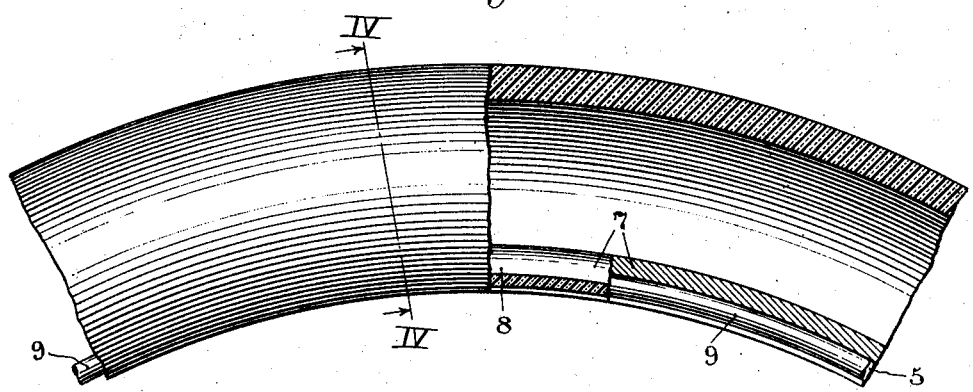
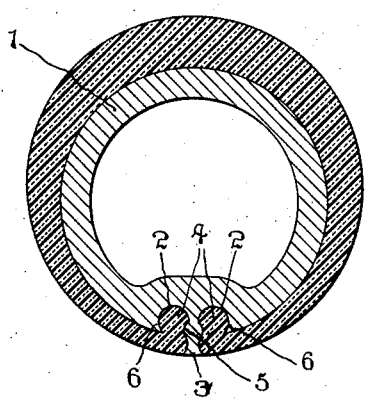
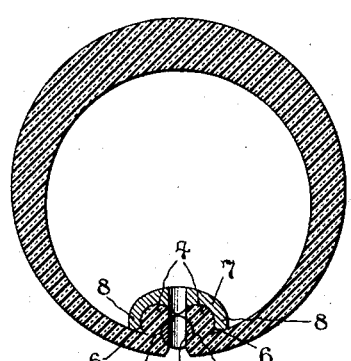
Inventor:
Henry Dech
by his attorney

UNITED STATES PATENT OFFICE.

HENRY DECH, OF TRENTON, NEW JERSEY, ASSIGNOR TO MERCER TIRE COMPANY, OF TRENTON, NEW JERSEY, A CORPORATION OF NEW JERSEY.

INNER TUBE AND METHOD OF MAKING THE SAME.

1,340,702. Specification of Letters Patent. Patented May 18, 1920.

Application filed August 14, 1918. Serial No. 249,808.

*To all whom it may concern:*

Be it known that I, HENRY DECH, a citizen of the United States, and resident of Trenton, in the county of Mercer and State of New Jersey, have invented a new and useful Improvement in Inner Tubes and Methods of Making the Same, of which the following is a specification.

This invention relates to a rubber inner tube for pneumatic vehicle tires and to a method for the manufacture of the same, with the particular object in view of providing an inner tube which can have any desired reinforcement or thickness as to its tread portion or outer periphery.

Another object consists in providing a method whereby tubes of such character may be expeditiously manufactured and the material of which the tube is composed vulcanized in substantially the same shape as that in which it is to be used.

Up to the present time it has been the general custom to manufacture inner tubes for pneumatic vehicle tires on either straight or spiral cores or mandrels. These tubes are commonly very thin and of a uniform thickness throughout. They serve as air-tight containers for the air which gives the tire its pneumatic character, and their rupture by direct puncture or by abrasion, results in the deflation of the tire as a whole. It has been found that one of the most frequent causes of deflation is the cracking or breaking of the fabric which constitutes the inside of the outer shoe or casing, which cracking or breaking raises a ridge which gradually chafes through the comparatively thin inner tube.

Furthermore, any small, sharp article which manages to penetrate the outer shoe or casing of the tire will rapidly wear through the ordinary tube, and when even a small hole is formed in the casing, the air pressure within the tube will force the wall of the inner tube therethrough and burst it. To obviate these disadvantages it has been suggested to either reinforce the outer portion of the tube with metal, fabric, etc., or to make that portion of the tube relatively thick. These suggestions have been found to be impractical when the tubes were made on straight or spiral mandrels and by methods now in common use.

My invention overcomes the difficulties mentioned and enables the rapid and satisfactory manufacture of inner tubes with thickened tread portions reinforced in any desired and practical manner to withstand wear.

A practical embodiment of my invention and of one form of apparatus which is adapted for carrying out my improved method is shown in the accompanying drawings in which, Figure 1 represents a side elevation, partly broken away, of a portion of the core or mandrel on which the tube is built and vulcanized, the tube being shown in position thereon.

Fig. 2 represents a side elevation of the finished tube, partly broken away to show the details of the structure.

Fig. 3 represents an enlarged section taken in the plane of the line III—III of Fig. 1, looking in the direction of the arrows, and Fig. 4 represents an enlarged section taken in the plane of the line IV—IV of Fig. 2, looking in the direction of the arrows.

The core which forms the tube is denoted by 1, and is provided along its inner periphery with recesses 2 and an intermediate tongue 3. The tube is built up on the core 1 in a manner and of materials well known to those skilled in the art. The tongue 3 of the core leaves a gap in the inner peripheral wall of the tube and the recesses 2 form the adjacent edges of the tube into inwardly extending ribs 4 which are so fashioned by the tongue and walls of the said recesses as to have a pair of complementary grooves 5 and 6 on their inner and outer faces respectively.

The tube having been built up on the core 1, in the form described, is now wound spirally with fabric or tape and vulcanized in a manner well known in the art. After the vulcanization is finished, the tape is removed and the tube stripped from the core 1. A clamping ring 7, which may be made of steel, hard rubber or any other suitable material, is now inserted into the tube through the gap between the ribs 4. This ring is provided with downwardly curving edges 8, which are adapted to seat in the grooves 6 in the outer faces of the ribs 4.

A locking ring 9, which is preferably made of steel, and is circular in cross section, is now forced between the ribs 4 and snapped into the grooves 5. The ring 9 serves to force the ribs into snug engagement with the ring 7 and thus locks the edges of the tube together making it air-tight. A suitable valve may be built into the tube and extended out through openings in the clamping ring and the locking ring, as shown at 9* in Fig. 4.

The tube is now complete and may be used in the ordinary manner.

It will be observed that by the above method, the tube is completely built and vulcanized in substantially the shape in which it is to be used and that the uniting of the edges of the tube does not require any appreciable distortion of the tread portion or walls.

It will be seen that the tube may be made of any desired thickness and may be reinforced with any suitable or convenient materials for the purpose of strengthening it.

I desire it to be understood that various changes may be resorted to in the form, construction and arrangement of the tube and of the apparatus used in carrying out the method of manufacturing it, and in the particular manner of conducting the steps of the method and in the order thereof, without departing from the spirit and scope of my invention; and hence I do not intend to be limited to the details herein shown and described except as they are specifically included in the claims.

What I claim is:

1. An inner tube divided circumferentially along its inner wall, a clamping ring located within the tube and adapted to engage the edges of said inner wall for holding them together to form an air-tight tube, and a locking ring adapted to be seated between said edges to force them into tight engagement with the clamping ring.

2. An inner tube divided circumferentially along its inner wall and having its adjacent edges provided with annular ribs projecting into the tube, the said ribs having a pair of outer complementary grooves, a clamping ring having side edges arranged to seat within the outer pair of grooves, and means for forcing the ribs into binding engagement with the clamping ring.

3. An inner tube divided circumferentially along its inner wall and having its adjacent edges provided with annular ribs projecting into the tube, the said ribs having pairs of inner and outer complementary grooves, a clamping ring having side edges arranged to seat within the outer pair of grooves, and a locking ring arranged to seat within the inner grooves to force the ribs into binding engagement with the clamping ring.

4. Method of making an inner tube comprising the following steps: first, building up on a suitable core a tube blank having a circumferential gap in its inner wall and having its edges adjacent the gap formed into inwardly projecting ribs; second, vulcanizing the tube blank; third, removing the tube blank from the core; fourth, inserting into the tube blank clamping means adapted to engage the outer faces of the ribs; and, fifth, inserting locking means between the ribs to force them into tight engagement with the clamping means.

5. Method of making an inner tube comprising the following steps: first, building up on a suitable core a tube blank having a circumferential gap in its inner wall and having its edges adjacent the gap formed into inwardly projecting ribs; second, vulcanizing the tube blank; third, removing the tube blank from the core; fourth, inserting into the tube blank a clamping ring adapted to engage the outer faces of the ribs; and, fifth, locking the edges of the tube blank together by inserting a locking ring between the ribs to force the ribs into tight engagement with the clamping ring.

6. Method of making an inner tube comprising the following steps; first, building up on a suitable core a tube blank having a circumferential gap in its inner wall and having its edges adjacent the gap formed into inwardly projecting ribs provided with complementary grooves in their inner and outer faces; second, vulcanizing the tube blank; third, removing the tube blank from the core; fourth, inserting into the tube blank a clamping ring adapted to engage the grooves in the outer faces of the ribs; and, fifth, locking the edges of the tube blank together by inserting into the grooves in the inner faces of the ribs a locking ring to force the ribs into tight engagement with the clamping ring.

In testimony, that I claim the foregoing as my invention, I have signed my name this 24th day of July 1918.

HENRY DECH.